(12) United States Patent
Rose et al.

(10) Patent No.: US 11,046,174 B2
(45) Date of Patent: Jun. 29, 2021

(54) FUEL TANK INLET

(71) Applicant: TISS Limited, Blackpool (GB)

(72) Inventors: Matthew Rose, Manchester (GB);
Ryan Wholey, Blackpool (GB);
Richard Forster, Blackpool (GB)

(73) Assignee: TISS LIMITED, Blackpool (GB)

( * ) Notice: Subject to any disclaimer, the term of this patent is extended or adjusted under 35 U.S.C. 154(b) by 103 days.

(21) Appl. No.: 16/084,806

(22) PCT Filed: Mar. 14, 2017

(86) PCT No.: PCT/GB2017/050697
§ 371 (c)(1),
(2) Date: Sep. 13, 2018

(87) PCT Pub. No.: WO2017/158346
PCT Pub. Date: Sep. 21, 2017

(65) Prior Publication Data
US 2019/0054822 A1 Feb. 21, 2019

(30) Foreign Application Priority Data

Mar. 14, 2016 (GB) .................................... 1604285

(51) Int. Cl.
*B60K 15/04* (2006.01)
(52) U.S. Cl.
CPC .. *B60K 15/0403* (2013.01); *B60K 2015/0461* (2013.01)
(58) Field of Classification Search
CPC .......... B60K 15/0403; B60K 2015/046; B60K 2015/03434; B60K 2015/0461
See application file for complete search history.

(56) References Cited

U.S. PATENT DOCUMENTS

| 2,053,546 A | * | 9/1936 | Anibal | ............... | B60K 15/0403 |
| | | | | | 220/86.3 |
| 2,371,241 A | * | 3/1945 | Jaffa | ................... | B60K 15/0403 |
| | | | | | 220/86.3 |

(Continued)

FOREIGN PATENT DOCUMENTS

| DE | 202010002793 U1 | 7/2010 |
| GB | 2476636 A | 6/2011 |

(Continued)

OTHER PUBLICATIONS

International Search Report and Written Opinion issued for PCT/GB 2017/050697, dated Jun. 28, 2017, 12 pages.

(Continued)

*Primary Examiner* — Don M Anderson
(74) *Attorney, Agent, or Firm* — Foley & Lardner LLP

(57) ABSTRACT

A fuel tank inlet assembly comprising a fuel tank inlet (200) defining an opening. The fuel tank inlet is configured for receipt by an aperture of the fuel tank (400). An anti-siphon device (300) is configured for receipt by the fuel tank inlet. The anti-siphon device defines an inlet aperture and comprises an anti-siphon portion configured to inhibit the passage of a siphon tube through the anti-siphon device. The fuel tank inlet comprises a first locking portion (206) and the anti-siphon device defines a second locking portion (307) configured to engage the first locking portion so as to secure the anti-siphon device to the fuel tank inlet such that the anti-siphon device is positioned within the fuel tank inlet entirely beyond the opening.

17 Claims, 6 Drawing Sheets

(56) References Cited

U.S. PATENT DOCUMENTS

| | | | | |
|---|---|---|---|---|
| 5,476,185 A * | 12/1995 | Jimerson | ............ | B60K 15/0403 |
| | | | | 220/86.3 |
| 6,755,057 B2 * | 6/2004 | Foltz | ...................... | B60K 15/04 |
| | | | | 141/312 |
| 2010/0193042 A1 * | 8/2010 | Keefer | ............... | B60K 15/0403 |
| | | | | 137/215 |
| 2014/0034176 A1 * | 2/2014 | Watson | ................... | F16L 55/00 |
| | | | | 138/103 |

FOREIGN PATENT DOCUMENTS

| | | | |
|---|---|---|---|
| GB | | 2476954 A | 7/2011 |
| WO | WO 2009/127812 | A1 | 10/2009 |
| WO | WO 2010/043874 | A1 | 4/2010 |
| WO | WO 2015/147621 | A2 | 10/2015 |
| WO | WO 2016/001346 | A1 | 1/2016 |

OTHER PUBLICATIONS

United Kingdom Search Report issued for GB1604285.5, dated Sep. 28, 2016, 4 pages.

\* cited by examiner

FUEL TANK INLET

CROSS-REFERENCE TO RELATED APPLICATIONS

The present application is a National Stage of PCT Application No. PCT/GB2017/050697, filed Mar. 14, 2017, which claims priority to GB Patent Application. No. 1604285.5, filed Mar. 14, 2016. The contents of both applications are incorporated herein by reference in their entirety.

The present invention relates to inlets for fluid storage tanks, such as a vehicle fuel tank. In particular, the present invention relates to a fuel tank inlet for use with an anti-siphon device, an anti-siphon device for use with a fuel tank inlet, a fuel tank inlet assembly, and a method of installing an anti-siphon device for a fuel tank inlet.

The theft of fuel by siphoning from the fuel tanks of vehicles, and in particular from the fuel tanks of commercial road vehicles, is a recognised problem. It is known to fit vehicles with a lockable fuel tank filler cap to prevent unauthorised access to the tank inlet. However, since the fuel filler cap is easily accessible to a potential thief, it is vulnerable to tampering and can often be forced open. In addition, it is not always practical to fit a vehicle with a lockable fuel filler cap.

It is known to provide vehicles with an anti-siphon device fitted to the inlet of the fuel tank. The applicant's European Patent EP1807280 discloses one such anti-siphon device comprising a tubular body having an inlet aperture located at a first end of the body, and a baffle comprising a metal plate provided with a plurality of fuel outlet holes located at a second, substantially opposite, end of the body. The anti-siphon device further comprises a float valve and is configured to be received within an inlet of a vehicle fuel tank. The anti-siphon device is held in place by a mounting that locates the anti-siphon device within the inlet aperture. The mounting defines a seat and a skirt arranged to be located over the neck of the inlet aperture, and is permanently secured to the inlet aperture by bonding and/or riveting. The mounting further comprises locking cap engaging features configured to engage a filler cap (which may or may not be lockable). Should a thief disengage the filler cap from the mounting of the anti-siphon device, the presence of the baffle within the body of the anti-siphon device prevents a thief from inserting a siphon hose into the fuel tank, thus preventing fuel theft from the tank. It is also known to secure anti-siphon devices to fuel tank inlets using screws, such as grub screws, located in the body of the anti-siphon device to outwardly engage an inner surface of the fuel tank inlet. Alternatively, the anti-siphon device may be secured using flexible tabs attached to the anti-siphon device which are bent outwards to secure the anti-siphon device to the fuel tank inlet.

Installation of such anti-siphon devices is often difficult and time consuming. Where adhesive is used to secure the anti-siphon device to the fuel tank inlet, the application of the adhesive may be messy and the adhesive must be left to set. An uneven coating of adhesive may result in a structurally weak join between the fuel tank inlet and the anti-siphon device. Fuel tank inlets are often relatively narrow in shape, which makes rivet-joining difficult as it is hard to access the inside of the inlet. Likewise, using screws to secure the anti-siphon device to the fuel tank inlet is also made more difficult by the narrow shape of the inlet. Furthermore, once discovered a thief may be able to undo the screws holding the anti-siphon device in place. It will further be appreciated that where the anti-siphon device is secured to the fuel tank inlet using flexible tabs, it is easy for a thief to deform the flexible tabs so as to remove the anti-siphon device from the fuel tank inlet.

In addition, anti-siphon devices often take up a relatively large amount of space above (i.e. to the exterior of) the fuel tank inlet. If insufficient space is available between the fuel tank inlet and another portion of the vehicle's bodywork, it will not be possible to install an anti-siphon device. Additionally, in certain applications it may be undesirable for the fuel tank inlet (including any attached anti-siphon device) to protrude significantly from the fuel tank itself. For example, the vehicle may be a heavy goods vehicle fitted with a low level trailer. The presence of the low level trailer may make it impossible to fit an anti-siphon device onto the fuel tank inlet of the vehicle, as the anti-siphon device may not fit under the low level trailer. Furthermore, an anti-siphon device which protrudes significantly from the fuel tank may be considered to be aesthetically displeasing; the anti-siphon device may provide a surface on to which debris can be deposited when the vehicle is moving; and the anti-siphon device may result in increased drag on the vehicle and therefore increased fuel consumption.

According to a first aspect of the invention there is provided a fuel tank inlet assembly comprising: a fuel tank inlet defining an opening, the fuel tank inlet configured to form part of a fuel tank; and an anti-siphon device which extends along a longitudinal axis and which is configured for receipt by the fuel tank inlet; the anti-siphon device defining an inlet aperture and comprising an anti-siphon feature configured to inhibit the passage of a siphon tube through the anti-siphon device; wherein the fuel tank inlet comprises a first locking portion and the anti-siphon device comprises a second locking portion configured to engage the first locking portion so as to secure the anti-siphon device to the fuel tank inlet.

For the avoidance of doubt when the second locking portion engages the first locking portion so as to secure the anti-siphon device to the fuel tank inlet, such securing is a locking securing. A locking securing is one where the first locking portion is locked to the second locking portion (such that the fuel tank inlet assembly is locked to the fuel tank inlet) such that is not possible to separate the first locking portion and second locking portion (and hence the fuel tank inlet assembly and the fuel tank inlet) without deforming and/or damaging the first and/or second locking portions. As is commonly understood by the term "lock", the locking securing between the first locking portion and second locking portion (and hence the fuel tank inlet assembly and the fuel tank inlet) prevents unauthorised separation of the first locking portion and second locking portion (and hence the fuel tank inlet assembly and the fuel tank inlet), thereby preventing unauthorised removal of the fuel tank inlet assembly from the fuel tank inlet (and hence unauthorised access to any fuel within the fuel tank via the fuel tank inlet).

The fuel tank inlet may comprise an inner surface defining the first locking portion.

The anti-siphon device is secured to the fuel tank inlet via the first and second locking portions in a non-releasable manner. It will be appreciated that because the anti-siphon device is secured to the fuel tank inlet via the first and second locking portions, once the anti-siphon device has been inserted within the fuel tank inlet such that the locking portions are engaged, no further installation steps are necessary. That is to say, the anti-siphon device is held in place by the engagement of the locking portions only, and does not require any additional holding means such as screws, rivets, or adhesives. As such, installation of the anti-siphon device within the fuel tank inlet is simple and fast.

It will be appreciated that engagement between the locking portion of the anti-siphon device and the corresponding locking portion of the fuel tank inlet prevents separation of the anti-siphon device and the fuel tank inlet in an axial direction (i.e. a direction parallel to a longitudinal axis of the body). However, it will be appreciated that in some embodiments the anti-siphon device may be permitted to rotate relative to the fuel tank inlet. Alternatively, the anti-siphon device and fuel tank inlet may comprise features which prevent relative rotation between the anti-siphon device and the fuel tank inlet. This is discussed in more detail below.

During use the anti-siphon device may be received by the fuel tank inlet such that the anti-siphon device is positioned within the fuel tank inlet beyond the opening. In other words, the entire anti-siphon device may be received by the fuel tank inlet such that the anti-siphon device is positioned within the fuel tank inlet beyond the opening. It will be appreciated that during normal use, a fuel dispenser nozzle may be received by the opening so as to permit the delivery of fuel into the fuel tank. As such, the term "beyond" is intended to refer to a position within the fuel tank inlet and/or the fuel tank that is past the location of the opening in the direction of insertion of a fuel dispenser nozzle. That is to say, when the locking portions are engaged, no part of the anti-siphon device protrudes above or out of the opening. It will be appreciated that a portion of the anti-siphon device may protrude into the fuel tank beyond the fuel tank inlet (i.e. into an interior of the fuel tank proper). It will be appreciated that such an arrangement of the anti-siphon device within the fuel tank inlet saves space, and thus allows an anti-siphon device to be incorporated in a vehicle with limited space between the fuel tank inlet and a fuel tank cover panel of the vehicle bodywork.

Furthermore, since the locking portions are located within the fuel tank inlet, access to the locking portions by a thief is only possible from within the fuel tank inlet. As such, tampering attempts by the thief are made considerably more difficult compared to an anti-siphon device in which the locking portions may be accessed from outside of the fuel tank inlet (for example, where the anti-siphon device is configured to fit over an opening of the fuel tank inlet).

One of the first and second locking portions may comprise a resiliently deformable member. By resiliently deformable member it is meant any component which is capable of being elastically deformed, in particular during insertion of the anti-siphon device within the fuel tank inlet. It will be appreciated that such a resiliently deformable member provides the advantage that "automatic" engagement between the fuel tank inlet and the anti-siphon device can be achieved. That is to say, elastic deformation can be used to create a snap-fit engagement without the need for any subsequent installation steps.

The first locking portion may define a first location feature; and the second locking portion may define a second location feature configured to co-operate with the first location feature so as to prevent relative rotation between the fuel tank inlet and the anti-siphon device. As such, both axial and rotational movement of the anti-siphon device within the fuel tank inlet is substantially prevented. This is advantageous in any situation where there is a preferable relative orientation between the anti-siphon device and fuel tank inlet. One such example is where the anti-siphon device comprises a closure flap configured to cover an aperture of the anti-siphon device. The closure flap may be configured to pivot about an axis located to one side of the anti-siphon device, and therefore it will be appreciated that there may be a preferable orientation of the closure flap relative to the insertion direction of the fuel dispensing nozzle. The preferable orientation of the closure flap relative to the insertion direction of the nozzle may be dependent upon the geometry of the nozzle, and/or the position of the fuel tank inlet within the vehicle. The orientation of the closure flap may be chosen before the anti-siphon device is inserted within the fuel tank inlet, and once inserted rotation of the anti-siphon device away from the chosen orientation is prevented by engagement of the location features of the anti-siphon device and the fuel tank inlet. Within the present document, one example of a feature co-operating with another feature is that said feature engages said another feature.

The first locking portion may comprise a first circumferentially extending groove defined by the inner surface; and the second locking portion may comprise a retaining ring configured to be at least partially received by the first groove. For example, the inner surface may define a first radius, and the first circumferentially extending groove may define a second radius which is greater than the first radius. Furthermore, the retaining ring may define an outer radius which is larger than the first radius of the inner surface. It will be appreciated that movement of the anti-siphon device in an axial direction will cause the retaining ring to contact the groove of the fuel tank inlet (i.e. the first groove). As such, axial separation of the anti-siphon device and the fuel tank inlet is prevented.

The anti-siphon device may include an inwardly recessed portion. The second groove may further define the inwardly recessed portion. The retaining ring may define an end, and the end may be configured to engage the inwardly recessed portion so as to prevent relative rotation between the retaining ring and the anti-siphon device. It will be understood that an end of the retaining ring is a part of the retaining ring that is disposed at an extremity of the retaining ring. The retaining ring may define two ends disposed at opposite extremes of the retaining ring, and a gap may be defined between the two ends. For example, the retaining ring may comprise a substantially c-shaped body defining first and second ends. It will be appreciated that one or both of the ends of the retaining ring may be configured to engage with the recessed portion of the body. As such, relative rotation between the retaining ring and the body is prevented. Relative rotation between the fuel tank inlet and the body of the anti-siphon device is therefore prevented by a combination of the engagement of the retaining ring and the fuel tank inlet, and the engagement between the retaining ring and the anti-siphon device.

The end of the retaining ring may comprise an inwardly extending protrusion configured for receipt by the inwardly recessed portion of the second groove, and wherein during normal use engagement of the inwardly extending protrusion and a wall of the inwardly recessed portion prevents relative rotation between the retaining ring and the anti-siphon device. The inwardly extending protrusion may form a generally L-shaped portion of the retaining ring. The inwardly extending protrusion may be formed by bending of an end of the retaining ring. It will be appreciated that engagement of the inwardly extending protrusion and the wall of the recessed portion substantially prevents relative rotation between the retaining ring and the anti-siphon device. However, such an engagement may only prevent relative rotation between the retaining ring and the anti-siphon device in a first direction. The recessed portion may therefore comprise a second wall substantially opposite the first wall configured to prevent relative rotation between the retaining ring and the anti-siphon device in a second direction substantially opposite the first direction. Alternatively, it will be appreciated that the second wall may be configured to engage an opposite end of the retaining ring (i.e. a second end) so as to substantially prevent relative rotation between the retaining ring and the body in the second direction. The opposite end of the retaining ring may also comprise an inwardly extending protrusion.

The first location feature may comprise a radially outwardly extending recess formed within the first circumferentially extending groove; and the second location feature may comprise a protrusion of the retaining ring; wherein during normal use the protrusion of the retaining ring may engage with a wall of the recess so as to substantially prevent relative rotation between the fuel tank inlet and the anti-siphon device. The recess of the first circumferentially extending groove may define a third radius that is greater than the second radius (i.e. the radius of the first groove). It will be appreciated that contact between the protrusion of the retaining ring and the wall of the recess prevents relative rotation between the fuel tank inlet and the retaining ring. However, such an engagement may only prevent rotation of the retaining ring relative to the fuel tank inlet in a first direction. As such, the recess may further comprise a second wall substantially opposite the first wall that is also configured to engage the protrusion of the retaining ring to therefore prevent relative rotation of the retaining ring in a second direction substantially opposite the first direction.

The protrusion may be formed of a generally u-shaped portion of the retaining ring.

The first location feature may comprise a radially inwardly extending protrusion. The radially inwardly extending protrusion may be located adjacent the first circumferentially extending groove or defined by the first circumferentially extending groove.

The retaining ring may define an end configured to engage the radially inwardly extending protrusion of the fuel tank inlet and the inwardly recessed portion of the anti-siphon device so as to prevent relative rotation between the fuel tank inlet and the anti-siphon device. That is to say, the end of the retaining ring may interpose and contact both the radially inwardly extending protrusion of the fuel tank inlet and the inwardly recessed portion of the anti-siphon device so as to prevent relative rotation between the fuel tank inlet and the anti-siphon device.

The inwardly extending protrusion of the fuel tank inlet may be configured to directly engage the inwardly recessed portion of the anti-siphon device so as to prevent relative rotation between the fuel tank inlet and the anti-siphon device. It will be appreciated that by "directly engage" it is meant that the inwardly extending protrusion of the fuel tank inlet may make contact with the inwardly recessed portion in such a manner that no third component of the fuel tank inlet assembly interposes the inwardly extending protrusion and the inwardly recessed portion when the inwardly extending protrusion and the inwardly recessed portion are in contact.

The retaining ring may be formed of a resiliently deformable material. By a "resiliently deformable material" it is meant a material which is able to undergo elastic deformation. Such a material will deform in response to an applied force, but will return to its original shape once the applied force is removed. Preferably, the retaining ring is formed of metal, such as steel, spring steel, or stainless spring steel, etc.

One of the first locking portion and the second locking portion may be a nose plunger and the other of the first locking portion and the second locking portion may be a recess configured to receive the nose plunger. The recess may be a circumferentially extending groove. In the case where the first locking portion is a nose plunger, the fuel tank inlet may be said to comprise an inner surface defined by the nose plunger. Conversely, in the case where the first locking portion is a recess configured to receive the nose plunger, the fuel tank inlet may be said to comprise an inner surface defining the recess. Alternatively, the recess may be a blind hole. It will be appreciated that where the recess is a blind hole, the nose plunger and the recess may at least partially define a location feature configured to prevent relative rotation between the anti-siphon device and the fuel tank inlet. It will be appreciated that nose plunger units may be bought as readily assembled items, and therefore assembly of a nose plunger in either the fuel tank inlet or the anti-siphon device can be achieved quickly and easily without the need for specialised tools.

It will be appreciated that during installation of the anti-siphon device within the fuel tank inlet, the retaining ring may be circumferentially compressed by the inner surface of the fuel tank inlet. That is to say, the retaining ring may be resiliently deformed by the inner surface of the fuel tank inlet. Once the retaining ring is aligned with the groove of the fuel tank inlet (i.e. the first groove) the retaining ring will return to an uncompressed position (or a relatively less deformed position), in which the retaining ring is received by the groove of the fuel tank inlet. It will be appreciated that this return back to the uncompressed position occurs automatically when the retaining ring is no longer compressed by the inner surface of the fuel tank inlet (i.e. when it is aligned with the first groove). This provides the advantage that the first and second locking portions engage automatically, without further input from the user. Any other appropriate locking portion may be utilised which provide for automatic engagement of the first and second locking portions and therefore automatic securing of the anti-siphon device within the fuel tank inlet.

The anti-siphon device may comprise a second circumferentially extending groove defined by an outer surface of the anti-siphon device; and the second groove may be configured to at least partially receive the retaining ring. It will be appreciated that movement of the anti-siphon device in an axial direction will cause the retaining ring to contact the groove of the anti-siphon device (i.e. the second groove). As such, axial separation of the anti-siphon device and the retaining ring is prevented. It will further be appreciated that because the retaining ring is at least partially received by the groove of the fuel tank inlet (i.e. the first groove) and at least partially received by the groove of the anti-siphon device (i.e. the second groove), the retaining ring prevents axial separation of the anti-siphon device and the fuel tank inlet once the retaining ring is at least partially received by both the first and second grooves (i.e. when the first and second locking portions are engaged). The second groove may be said to form part of the second locking portion.

The fuel tank inlet assembly may further comprise a closure portion. The closure portion is not the same as a closure cap which commonly closes a fuel tank inlet and which is discussed in more detail below. It will be appreciated that the purpose of the closure portion is to prevent fuel stored in the fuel tank from escaping the fuel tank via the fuel tank inlet. When a vehicle containing the fuel tank is in motion, fuel stored in the fuel tank may begin to move within the fuel tank, resulting in unpredictable splashing of fuel within the fuel tank. The closure portion prevents fuel from escaping the fuel tank by providing a barrier between an opening of the fuel tank inlet and the fuel tank itself. This is particularly advantageous in scenarios where a fuel tank filler cap is broken or a user forgets to attach a fuel tank filler cap to the vehicle. In addition, in the event of the vehicle overturning and the fuel cap being displaced, the closure portion ensures minimal fuel leakage from the fuel tank, thus reducing harm to the environment and reducing the risk of fire occurring as a result of fuel leaked from an overturned vehicle. It will be appreciated that the closure portion may form part of the fuel tank inlet, or alternatively the closure portion may form part of the anti-siphon device.

The closure portion may define an aperture configured to receive a fuel dispenser, and may further comprise a closure flap configured to selectively open and close the aperture. The aperture may be defined by an inwardly extending annular flange, and the closure portion may further comprise a biasing member configured to urge the closure flap into a closed position in which the closure flap bears against the annular flange.

During use a nozzle of a fuel dispenser may be inserted into the aperture to contact the closure flap and thereby urge the closure flap towards an open position in which the nozzle may pass through the aperture to permit fuel to be dispensed into the fuel tank. The closure portion may be positioned between the opening of the fuel tank inlet and the first locking portion. That is to say, the closure portion may form part of the fuel tank inlet. As such, the closure portion is separate to the anti-siphon device. Alternatively, the aperture of the closure portion may be the aperture of the anti-siphon device. That is to say, the closure portion may form part of the anti-siphon device. As such, the closure portion is separate to the fuel tank inlet.

The anti-siphon feature may comprise a baffle configured to substantially prohibit the passage of a siphon tube through the body. It will be appreciated that the presence of the baffle prevents the siphon tube from entering the fuel tank, and therefore theft of fuel from the fuel tank is prevented.

The anti-siphon feature may define a plurality of outlet apertures configured to permit the passage of fuel through the anti-siphon device. It will be appreciated that the plurality of outlet apertures allows fuel to flow from a fuel dispenser inserted into an opening of the anti-siphon device through the body of the anti-siphon device and into the fuel tank. The plurality of outlet apertures may be formed within the body of the anti-siphon device and/or the baffle of the anti-siphon device.

The inner surface of the fuel tank inlet may be generally cylindrical. The anti-siphon device may be generally tubular.

The anti-siphon device may define a tapered portion. It will be appreciated that the tapered portion may be configured to encourage engagement of the retaining ring within the groove of the anti-siphon device (i.e. the second groove). That is to say, during assembly the retaining ring may be received by the second groove by sliding the retaining ring over a portion of the anti-siphon device comprising the taper. For example, the retaining ring may be made of a resiliently deformable material (e.g. a metal), and the taper may allow the retaining ring to be gradually widened such that the retaining ring fits over the outer surface of the body defining the second groove. Once positioned over the second groove, the retaining ring may deform back to its original width (or a width less than that before it is received by the groove) such that the retaining ring is received within the second groove. It will further be appreciated that the tapered portion may be configured to guide the anti-siphon device during installation when it is received by the fuel tank inlet. The tapered portion may be located adjacent the second locking portion (e.g. the second groove of the anti-siphon device).

The fuel tank inlet may comprise a tapered portion adjacent the first locking portion. In the example where the first locking portion is a groove and the second locking portion includes a retaining ring, the tapered portion of the fuel tank inlet may be configured to encourage engagement of the retaining ring within the groove of the fuel tank inlet.

The fuel tank inlet may comprise an inwardly extending annular portion, and the annular portion may comprise the first locking portion. The annular portion may be integral with the fuel tank inlet such that the annular portion and the fuel tank inlet are formed as one piece. Alternatively, the annular portion may be formed as a separate piece to the fuel tank inlet. The annular portion may be attached to the fuel tank inlet by any suitable means, such as, for example, by gluing or welding.

The inner surface may be an inner surface of the annular portion. The annular portion may comprise an annular ledge inwardly extending from the inner surface, and the annular ledge may be configured to support a portion of the anti-siphon device. The annular ledge may extend radially outwards from the inner surface of the annular portion.

The opening of the fuel tank inlet may comprise a cap securing arrangement configured to receive a securing portion of a fuel tank filler cap. It will be appreciated that the cap securing arrangement and securing portion may comprise any suitable means of securing the fuel tank filler cap to the fuel tank inlet. For example, the cap securing arrangement may comprise a bayonet socket and the securing portion may be a bayonet portion of the fuel tank filler cap configured to be received by the bayonet socket. Alternatively, the cap securing arrangement may be a screw thread defined by the fuel tank inlet, and the securing portion may be a corresponding screw thread defined by the fuel tank filler cap.

According to a second aspect of the invention there is provided a method of installing a fuel tank inlet assembly according to the first aspect of the invention, wherein the method comprises: inserting the anti-siphon device within the fuel tank inlet; and engaging the first locking portion with the second locking portion.

The method may further comprise inserting the anti-siphon device within the fuel tank inlet so that it does not protrude from the opening of the fuel tank inlet. The method may further comprise inserting the anti-siphon device within the fuel tank inlet so that the first locking portion automatically engages with the second locking portion when the anti-siphon device is inserted within the inlet of the fuel tank. It will be appreciated that the first locking portion may be a groove and the second locking portion may be a resiliently deformable retaining ring which may be located in a groove of the anti-siphon device. During installation of the anti-siphon device, the retaining ring may be circumferentially compressed by the inner surface of the fuel tank inlet. Once the retaining ring is axially aligned with the groove, the retaining ring is no longer compressed by the inner face of the fuel tank inlet, and will return to an uncompressed (or less compressed) position in which the retaining ring is received by the groove of the fuel tank inlet. It will be understood that such a return to an uncompressed (or less compressed) position occurs automatically (i.e. without the further input of a user). This therefore provides the advantage that assembly of the anti-siphon device within the fuel tank inlet is simple and fast.

According to a third aspect of the invention there is provided a fuel tank inlet comprising a generally tubular body configured for receipt by an aperture of the fuel tank, wherein the body defines an opening, and wherein the body is configured to receive an anti-siphon device through the opening, the body further comprising a locking portion configured to engage a corresponding locking portion of the anti-siphon device to thereby secure the anti-siphon device to the body.

The body may define an inner surface comprising the locking portion configured to engage the corresponding locking portion of the anti-siphon device.

It will be appreciated that the anti-siphon device does not need to be present for the fuel tank inlet to be able to receive fuel. As such, the fuel tank inlet of the third aspect of the invention may be used as a fuel tank inlet without also comprising an anti-siphon device according to any other aspect of the invention. A vehicle containing such a fuel tank inlet may have an anti-siphon device installed later, as an optional feature of the fuel tank inlet.

During use the anti-siphon device may be received by the body such that the anti-siphon device is positioned within the body beyond the opening. During use the anti-siphon device may be received by the body such that the anti-siphon device is positioned entirely within the body beyond the opening. The locking portion of the fuel tank inlet may define a location feature configured to co-operate with a corresponding location feature of the anti-siphon device to thereby prevent relative rotation between the anti-siphon device and the body. The locking portion of the fuel tank inlet may be a circumferentially extending groove.

The location feature of the fuel tank inlet may comprise a radially outwardly extending recess formed within the groove; and during normal use the corresponding locking portion of the anti-siphon device may engage with a wall of the recess so as to substantially prevent relative rotation between the fuel tank inlet and the anti-siphon device.

The location feature may comprise a radially inwardly extending protrusion defined by the first circumferentially extending groove.

The locking portion may comprise a resiliently deformable member. The locking portion may be a nose plunger.

The fuel tank inlet may further comprise a closure portion. The closure portion may define an aperture configured to receive a fuel dispenser, and the closure portion may further comprise a closure flap configured to selectively open and close the aperture. The aperture may be defined by an inwardly extending annular flange, and the anti-siphon device may further comprise a biasing member configured to urge the closure flap into a closed position in which the closure flap bears against the annular flange. During use a nozzle of a fuel dispenser may be inserted into the aperture to contact the closure flap and thereby urge the closure flap towards an open position in which the nozzle may pass through the aperture to permit fuel to be dispensed into the fuel tank.

The fuel tank inlet may comprise an inwardly extending annular portion, and the annular portion may comprise the locking portion.

The closure portion may be positioned between the opening and the locking portion. The body may comprise an inwardly extending annular portion, and the inner surface may be an inner surface of the annular portion. The annular portion may comprise an annular ledge inwardly extending from the inner surface, and the annular ledge may be configured to support a portion of the anti-siphon device.

The opening of the fuel tank inlet may comprise a cap securing arrangement configured to receive a securing portion of a fuel tank filler cap.

According to a fourth aspect of the invention there is provided an anti-siphon device comprising: a generally tubular body configured for receipt by a fuel tank inlet; the body defining an inlet aperture; an anti-siphon portion supported by the body and configured to inhibit the passage of a siphon tube through the body; and a locking portion configured to engage a corresponding locking portion of a fuel tank inlet to thereby secure the anti-siphon device to the fuel tank inlet.

During use the anti-siphon device may be received by the fuel tank inlet such that the anti-siphon device is positioned within the fuel tank inlet beyond an opening of the fuel tank inlet. During use the anti-siphon device may be received by the fuel tank inlet such that the anti-siphon device is positioned within the fuel tank inlet entirely beyond an opening of the fuel tank inlet. The locking portion of the anti-siphon device may define a location feature configured to co-operate with a corresponding location feature of the fuel tank inlet to thereby prevent relative rotation between the anti-siphon device and the fuel tank inlet. The locking portion of the anti-siphon device may comprise a retaining ring.

The locking portion may comprise a resiliently deformable member.

The anti-siphon device may comprise a circumferentially extending groove defined by an outer surface of the anti-siphon device; and the groove may be configured to at least partially receive the retaining ring. The locking portion of the anti-siphon device may be said to include said groove. The groove may further define an inwardly recessed portion. The retaining ring defines an end, and the end may be configured to engage the inwardly recessed portion so as to prevent relative rotation between the retaining ring and the anti-siphon device.

The end of the retaining ring may comprise an inwardly extending protrusion configured for receipt by the inwardly recessed portion of the groove, and during normal use engagement of the inwardly extending protrusion and a wall of the inwardly recessed portion may prevent relative rotation between the retaining ring and the anti-siphon device.

The location feature of the anti-siphon device may comprise a protrusion of the retaining ring that extends in a radially outward direction, and wherein during normal use the protrusion may engage with the corresponding location feature of the fuel tank inlet so as to substantially prevent relative rotation between the fuel tank inlet and the anti-siphon device. It will be appreciated that in such an embodiment of the invention, the corresponding location feature may be a radially outwardly extending recess of the fuel tank inlet.

The protrusion may be formed of a generally u-shaped portion of the retaining ring. The retaining ring may be formed of a resiliently deformable material.

The retaining ring may define an end configured to engage the corresponding location feature of the fuel tank inlet and the inwardly recessed portion of the anti-siphon device so as to prevent relative rotation between the fuel tank inlet and the anti-siphon device. For example, in such an embodiment of the present invention the corresponding location feature of the fuel tank inlet may be a radially inwardly extending protrusion of the fuel tank inlet.

The corresponding location feature of the fuel tank inlet and the inwardly recessed portion of the anti-siphon device may be configured to directly engage so as to prevent relative rotation between the fuel tank inlet and the anti-siphon device. For example, in such an embodiment of the present invention the corresponding location feature of the fuel tank inlet may be a radially inwardly extending protrusion of the fuel tank inlet. It will be appreciated that by "directly engage" it is meant that the inwardly extending protrusion of the fuel tank inlet may make contact with the inwardly recessed portion in such a manner that no third component interposes the inwardly extending protrusion and the inwardly recessed portion when they are in contact.

The locking portion may be a circumferentially extending groove. The locking portion may be a blind hole.

The anti-siphon device may further comprise a closure flap configured to selectively open and close the inlet aperture. The aperture may be defined by an inwardly extending annular flange, and the anti-siphon device may further comprise a biasing member configured to urge the closure flap into a closed position in which the closure flap bears against the annular flange. The anti-siphon device may be configured such that during use a nozzle of a fuel dispenser inserted into the inlet aperture may contact the closure flap and thereby urge the closure flap towards an open position in which the nozzle may pass through the aperture to permit fuel to be dispensed into the fuel tank.

The anti-siphon feature may comprise a baffle configured to substantially prohibit the passage of a siphon tube through the body. The anti-siphon feature may define a plurality of outlet apertures configured to permit the passage of fuel through the anti-siphon device. The body may define a tapered portion. The tapered portion may be adjacent the locking portion of the anti-siphon device.

It will be appreciated that the above described advantages of one aspect of the invention may, if appropriate, equally apply to any other aspect of the invention. Likewise, it will further be appreciated that the optional features, advantages, and alternatives described above with respect to one aspect of the invention may, if appropriate, equally apply with respect to any other aspect of the invention.

A detailed description of the invention will now be described with reference to the accompanying drawings, in which.

Figure 1:
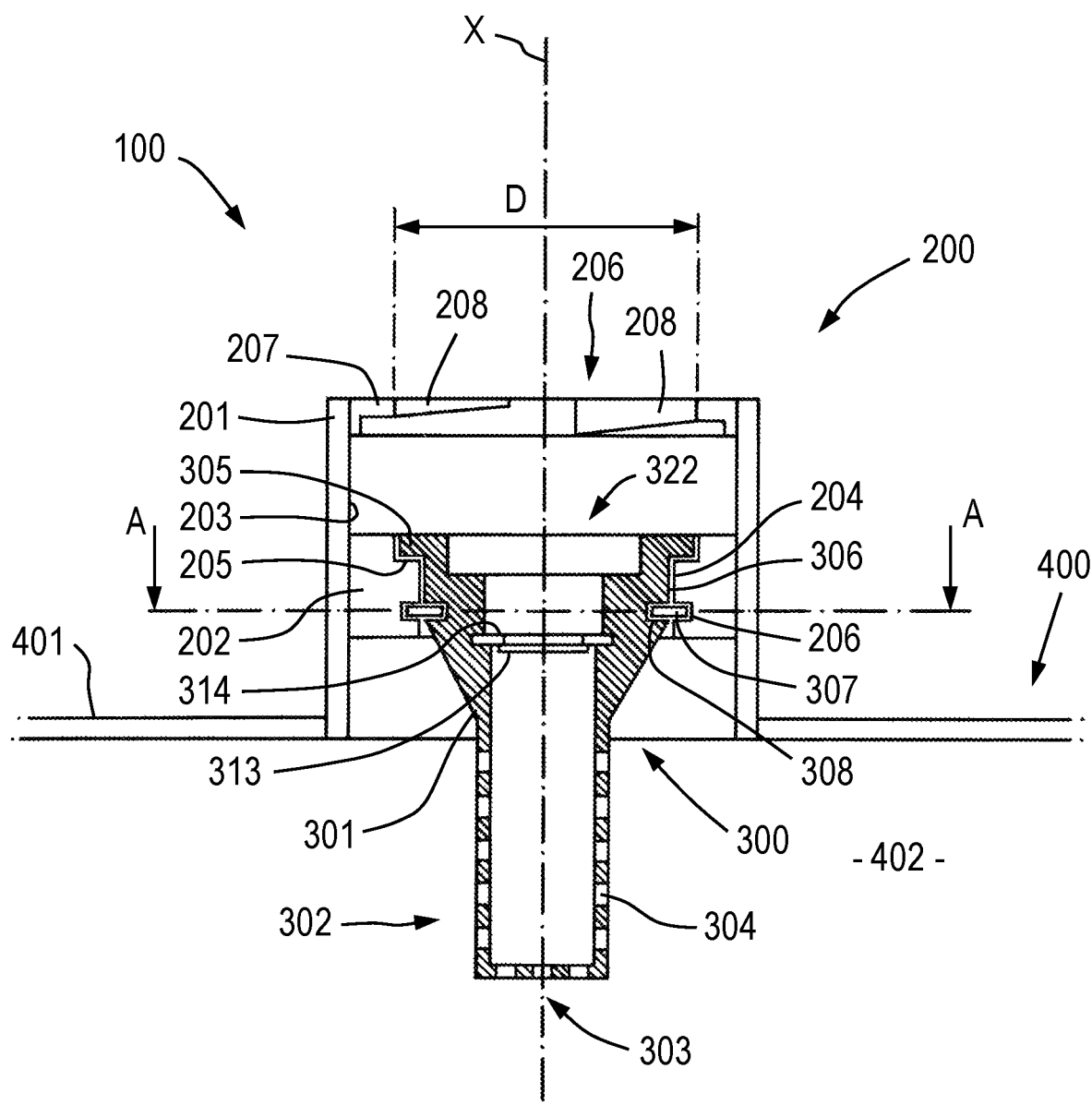
FIG. 1 is a first side-on cross sectional view of a first embodiment of a fuel tank inlet assembly taken along section C-C shown in FIG. 3.
Figure 3:
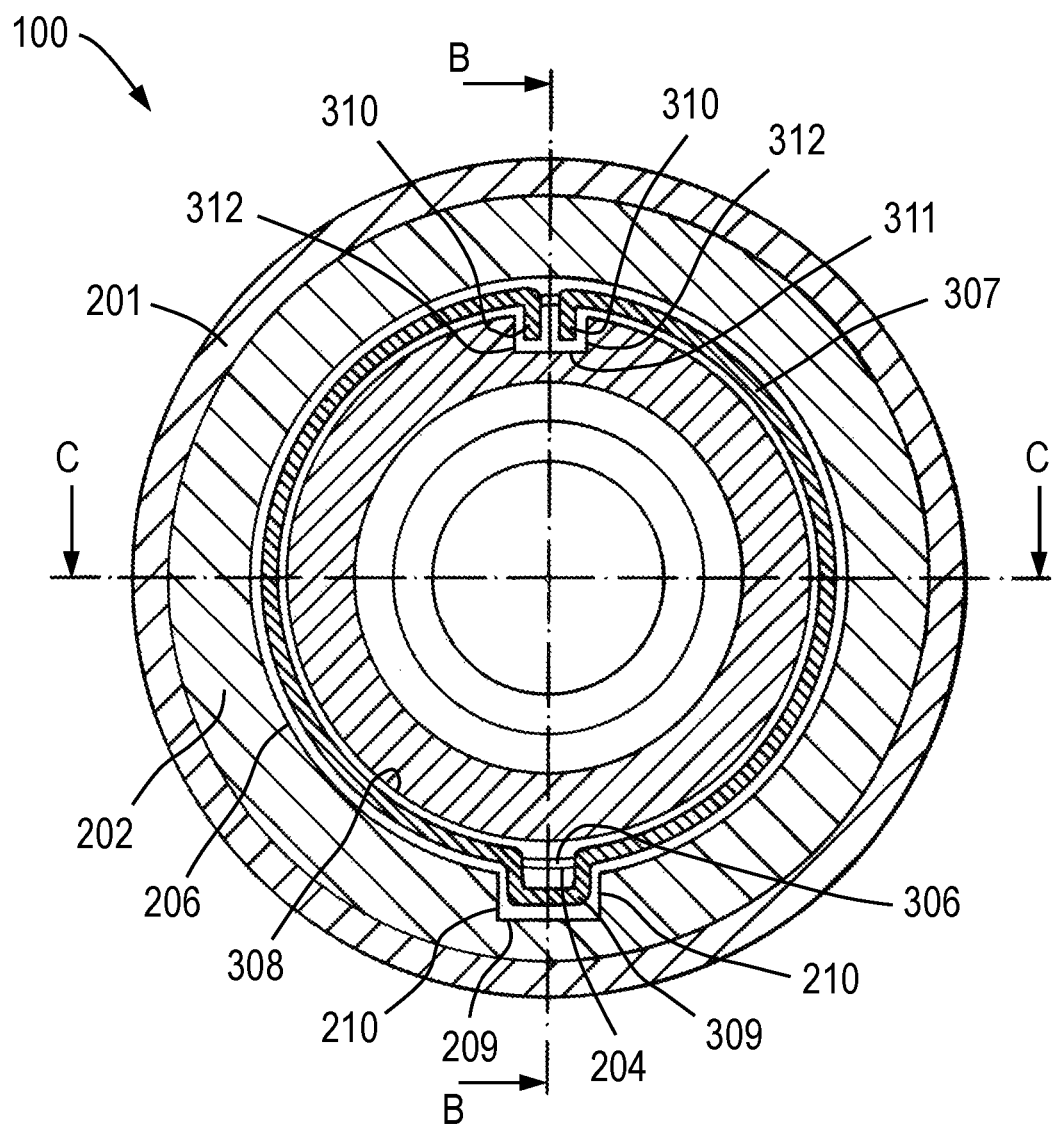
FIG. 3 is a top-down cross-sectional view of the first embodiment of a fuel tank inlet assembly taken along section A-A shown in FIGS. 1 and 3.

FIG. 1 shows a cross-sectional view of a first embodiment of a fuel tank inlet assembly 100 taken along section C-C shown in FIG. 3. The fuel tank inlet assembly 100 defines a longitudinal axis X and comprises a fuel tank inlet 200 and an anti-siphon device 300. The fuel tank inlet 200 is configured to receive a nozzle of a fuel dispenser (not shown) so as to permit fuel to be dispensed into a fuel tank 400. The fuel tank inlet 200 comprises a generally tubular body portion 201, which is received by a generally circular aperture formed in a wall 401 of the fuel tank 400. The fuel tank inlet 200 is typically formed of metal, and may be attached to the wall 401 of the fuel tank 400 by any suitable means, such as, for example, by gluing or welding. Dispensed fuel is stored within an interior 402 of the fuel tank 400, bounded by the wall 401.

The fuel tank inlet 200 comprises an inwardly extending annular portion (or ring) 202 which is connected to a generally cylindrical inner wall 203 of the body portion 201. The annular ring 202 may be integral with the body portion 201, such that the annular ring 202 and body portion 201 are formed as one piece. Alternatively, the annular ring 202 may be formed as a separate piece to the body portion 201 and may be attached to the body portion by any suitable means, such as, for example, by gluing or welding. The annular ring 202 defines a generally cylindrical inner surface 204 configured to receive a portion of the anti-siphon device 300.

The anti-siphon device 300 comprises a generally tubular body 301 which extends along the longitudinal axis X and which defines a generally cylindrical inlet aperture 322 configured to receive a nozzle of a fuel dispenser so as to permit fuel to be dispensed into the interior 402 of the fuel tank 400 via the anti-siphon device. The anti-siphon device 300 is typically formed of metal and further comprises an anti-siphon portion 302 formed as a lower tubular portion of the anti-siphon device 300 comprising a baffle 303 and a plurality of outlet apertures 304. During use, the outlet apertures 304 permit fuel to pass from an interior of the anti-siphon device and into the interior 402 of the fuel tank 400. The outlet apertures 304 define a diameter which is narrower than a diameter of a siphon tube. During use, when a thief attempts to steal fuel from the interior 402 of fuel tank 400, the anti-siphon portion 302 prevents a siphon tube from penetrating into the interior 402 due to the narrow diameter of the outlet apertures 304. As such, theft of fuel from the fuel tank 400 is prevented or minimised. It will be appreciated that the anti-siphon portion 302 may comprise any alternative anti-siphon feature, such as, for example, an anti-siphon portion including a generally dome shaped obstruction member or baffle as shown in GB2476954 or WO2009127812 and/or a float valve of the kind described above with reference to EP1807280. As such, it will be understood that the arrangement of the anti-siphon portion 302 is not intended to be limiting on the invention.

The anti-siphon device 302 defines a circumferentially extending flange portion 305 which is configured to rest upon a circumferential ledge 205 of the annular ring 202. The anti-siphon device further defines a generally cylindrical outer surface 306 configured to be received within a region bounded by the inner surface 204 of the annular ring 202. The inner surface 204 of the annular ring 202 defines a diameter which is larger than a diameter of the outer surface 306 of the anti-siphon device 300 such that a small tolerance gap is formed between the inner surface 204 and the outer surface 306 so as to permit the anti-siphon device 300 to be received by the fuel tank inlet 200. It will be appreciated that, once installed, substantially no part of the anti-siphon device is external to the fuel tank inlet 200 and/or the fuel tank inlet 400. That is to say, the anti-siphon device is entirely located within the fuel tank inlet 200 and/or the fuel tank 400. This differs from known anti-siphon devices, such as that shown in WO2009127812, which include an attachment means comprising a collar adapted to seat over the neck of a conventional fuel tank inlet—hence the collar of such a known anti-siphon device is located exterior to the fuel tank inlet.

The fuel tank inlet 200 defines an opening 206 configured to receive the anti-siphon device 300. The opening defines a cap securing arrangement in the form of bayonet mount portion 207 configured to receive a corresponding securing portion of a fuel tank filler cap (not shown—e.g. in the form of bayonet lug portions) so as to secure the filler cap to the fuel tank inlet 200 and thereby close the opening 206 of the fuel tank inlet. The bayonet mount portion 207 comprises a pair of circumferentially arranged flanges 208 each defining a tapered lower face configured to contact a corresponding lug of the fuel tank filler cap. The flanges 208 of bayonet mount portion 207 define a diameter D (relative to the longitudinal axis) which is larger than a diameter of the flange portion 305 of the anti-siphon device 300. It will be appreciated that the flange portion 305 of the anti-siphon device 300 corresponds to the widest part of the anti-siphon device 300 (i.e. the part of the anti-siphon device which has the greatest diameter relative to the longitudinal axis). As such, during use the anti-siphon device 300 may be passed through the opening 206 before being received by the annular portion 202. As described above, the anti-siphon device is located within the fuel tank inlet 200 such that substantially the entire anti-siphon device 300 is positioned longitudinally beyond the opening 206 of the fuel tank inlet 206. By being positioned beyond the opening of the fuel tank inlet it is meant is that no portion of the anti-siphon device extends outside of the fuel tank inlet in the direction of the opening 206. Put another way, the entire anti-siphon device is located downstream (with reference to the direction of any fluid flowing into the fuel inlet) of the opening of the fuel tank inlet.

It will be appreciated that the fuel tank inlet 200 may comprise any alternative cap securing arrangement configured to receive and secure a filler cap so as to close the opening of the fuel inlet. For example, the cap securing arrangement may comprise a threaded portion formed on an inner surface of the fuel tank inlet 200, configured to receive a correspondingly threaded outer surface of the filler cap. It will be appreciated that the cap securing arrangement of the filler cap and fuel inlet is not intended to be limiting on the invention, provided that the anti-siphon device 300 may pass through the opening 206 of the fuel tank inlet 200.

The annular portion 202 comprises a first locking portion in the form of a first circumferentially extending groove 206 defined by the inner surface 204. The first groove 206 defines a diameter which is larger than a diameter of the inner surface 204 of the annular portion 202. The anti-siphon device 300 defines a second locking portion comprising a retaining ring 307 received within a second circumferentially extending groove 308 defined by the outer surface 306 of the anti-siphon device 300. The groove 308 defines a diameter which is smaller than the diameter of the outer surface 306 adjacent the groove 308. Engagement of the first and second locking portions prevents separation of the anti-siphon device 300 and the fuel tank inlet 200 in a longitudinal direction (i.e. in a direction generally parallel to the longitudinal axis X). The retaining ring 307 defines an inner diameter which is less than the diameter of the outer surface 306 of the anti-siphon device 300 adjacent the groove 308, and an outer diameter which is greater than the diameter of the inner surface 204 of the annular portion 202. As such, when the anti-siphon device is installed within the annular portion 202 of the fuel tank inlet 200, the retaining ring 307 is simultaneously received within both the first groove 206 and the second groove 308. Should a thief attempt to remove the anti-siphon device 300 from the fuel tank inlet 200 by urging the anti-siphon device in a longitudinal direction (i.e. parallel to the longitudinal axis X), the retaining ring 307 will contact a portion of both the first and second grooves 206, 308 simultaneously, and therefore prevent separation of the anti-siphon device 300 and the fuel tank inlet 200.

Advantageously, because the retaining ring 307 is located between the anti-siphon device and annular portion of the fuel tank inlet, the retaining ring is not readily accessible. It follows that it would be very difficult for a potential thief to access the retaining ring in an attempt to damage it in order to separate the anti-siphon device from the fuel tank inlet. Furthermore, the flange 305 of the anti-siphon device further prevents a potential thief from accessing the retaining ring by preventing a straight-line path between the anti-siphon device and annular portion of the fuel tank inlet to the retaining ring 307.

Figure 2:
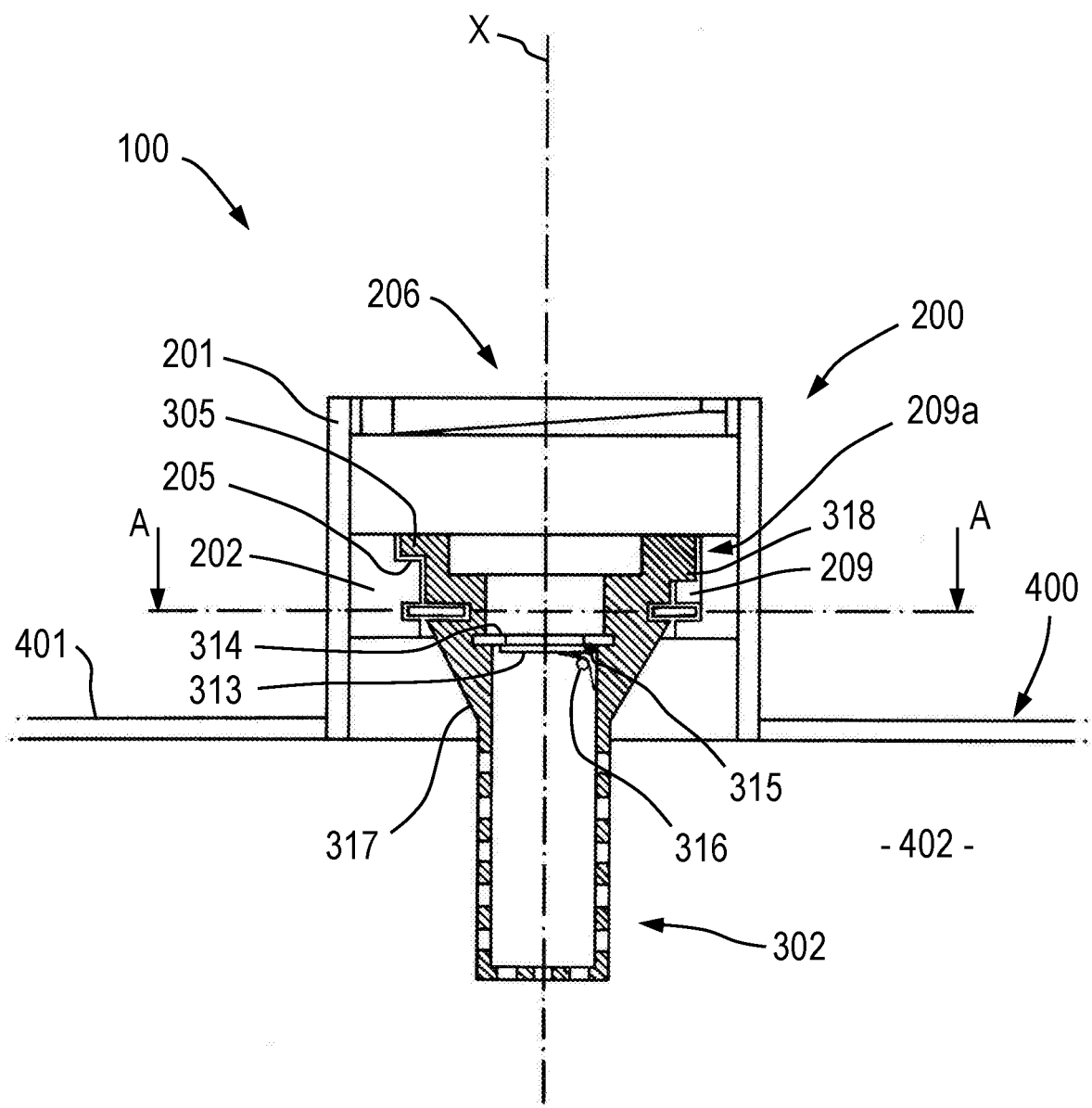
FIG. 2 is a second side-on cross sectional view of the first embodiment of a fuel tank inlet assembly taken along section B-B shown in FIG. 3.

With reference to FIGS. 1 and 2, the anti-siphon device 300 further comprises a closure portion in the form of a closure flap 313 and an annular flange 314. The closure flap 313 is connected to the annular flange by a hinge 315 and is urged towards a closed position in which the closure flap 313 bears against the annular flange 314 by a biasing member in the form of a torsion spring 316. The orientation of annular flange 314, hinge 315 and torsion spring 316 is fixed relative to the body 301 of the anti-siphon device 300. The annular flange 314 defines an aperture having a diameter greater than a diameter of a nozzle of a fuel dispenser such that the nozzle of the fuel dispenser may pass through the aperture. During use, when the nozzle is inserted into the aperture, the nozzle contacts the closure flap 313 and urges the closure flap 313 towards an open position in which fuel can be dispensed from the nozzle into the fuel tank 400 via the anti-siphon device. When the nozzle is removed, the torsion spring 316 urges the closure flap back into the closed position. It will be appreciated that the aperture of the annular flange 314 is an aperture of the anti-siphon device 300.

The closure portion acts to prevent fuel contained in the fuel tank 400 from escaping. For example, during vehicle transit, fuel stored in the fuel tank 400 may become agitated by motion of the vehicle. This agitation may result in splashing of the fuel within the fuel tank 400, and may cause fuel to splash upwards through the fuel tank inlet 200. Rolling of the vehicle, such as in off-road conditions or as a result of an accident may also cause fuel to flow out of the fuel tank 400 through the fuel tank inlet 200. The closure portion therefore provides a barrier between fuel stored in the fuel tank 400 and the opening 206 of the fuel tank inlet 200 to prevent (or minimise) fuel escaping.

It will be appreciated that although the closure portion is described as forming part of the anti-siphon device 300, alternatively the closure portion may form part of the fuel tank inlet 200. As such, the closure portion may be positioned within the fuel tank inlet 200 between the opening 206 and the annular ring 202. Furthermore, the closure portion may take any appropriate form—further examples of suitable closure portions are shown in GB2476636.

It will further be appreciated that because the closure flap 313 is attached to the annular flange 314 by the hinge 316, there exists a preferable orientation of the closure portion relative to an angle of entry of the nozzle of the fuel dispenser. For example, it may be preferable that the nozzle initially contacts the closure flap 313 at a location generally to the left in FIG. 2—at this location, given that the hinge 316 is located to the right in FIG. 2, the nozzle will exert a greater moment about the pivot point formed by the hinge, thereby making it easier for the nozzle to overcome the spring bias and move the closure flap to the open position. Additionally, given the curvature of a standard fuel filler nozzle, it may be advantageous for the nozzle to be inserted from a direction generally to the right of FIG. 3. In this relative orientation between the filler nozzle and the closure flap when the closure flap 313 is in the open position the closure flap 313 is generally parallel to the angle of entry of the nozzle. This results in the closure flap providing little or no obstruction to fuel flowing from the filler nozzle, thereby improving the fuel filling rate which is achievable through the anti-siphon device.

In light of the discussion above it will be appreciated that it may be advantageous to avoid relative rotation between the closure flap (and hence the anti-siphon device 300) and the fuel tank inlet 200. This is because, in some applications, it may be desirable to install the anti-siphon device within the fuel tank inlet with a particular orientation relative to the fuel inlet such that when a fuel filler nozzle is inserted into the fuel tank inlet, the fuel filler nozzle is aligned with respect to the closure flap in the advantageous manner discussed above. Once the anti-siphon device has been installed with the desirable alignment relative to the fuel tank inlet, it is further advantageous for any relative rotation between the anti-siphon device (and hence the closure flap) to be substantially prevented so as to retain the desired alignment.

As is shown in FIG. 3, the retaining ring 307 is generally c-shaped and comprises a location feature in the form of a protrusion 309 formed as a generally u-shaped bend which extends in a radially outward direction. The protrusion 309 is received within a corresponding location feature in the form of a radially extending recess 209 of the annular ring 202. The recess 209 of the annular ring 202 defines a diameter which is greater than an outer diameter of the protrusion 309 and greater than the diameter of the rest of the first groove 206. The recess 209 of the first groove 206 defines walls 210 configured to engage the protrusion 309 of the retaining ring 307 so as to substantially prevent relative rotation between the retaining ring 307 and the annular portion 202 of the fuel tank inlet 200. Although the protrusion 309 is described as a generally u-shaped bend of the retaining ring 307, it will be appreciated that the protrusion 309 may be formed of any radially extending portion of the retaining ring 307, such as a lug, bump or flange of the retaining ring 307.

As part of the location feature, the retaining ring 307 further defines two ends 310 which are disposed diametrically opposite the protrusion 309. The ends 310 comprise inwardly extending protrusions in the form of flanges which are received by a radially inwardly recessed portion 311 formed in the second groove 308 of the anti-siphon device 300. The recessed portion 311 of the second groove 308 and the inwardly extending flanges 310 of the retaining ring 307 each define a radial distance which is less than the radius of the second groove 308. The recessed portion 311 of the second groove 308 defines walls 312 which are configured to engage the ends 310 of the retaining ring 307 so as to substantially prevent relative rotation between the retaining ring 307 and the anti-siphon device 300.

It will be appreciated that both the protrusion 309 and the inwardly extending flanges may be formed by bending of the retaining ring 307. Alternatively, the protrusion 309 and flanges of the retaining ring 307 may be formed with the retaining ring in a single process, such as by stamping or casting.

When a twisting force (i.e. a rotational force/torque about the longitudinal axis X) is applied to the anti-siphon device 300, one of the ends 310 of the retaining ring 307 engages one of the walls 312 of the recessed portion 311 formed in the second groove 308 of the anti-siphon device 300. The twisting force then urges the anti-siphon device 300 and the retaining ring together such that the protrusion 309 of the retaining ring 307 engages one of the walls 210 of the recess 209 formed in the first groove 206 of the annular ring 202. Such engagement between the protrusion 309 and the recess 209 of the first groove 206 prevents further rotation of the anti-siphon device 300 relative to the fuel tank inlet 200. It will be appreciated that due to manufacturing tolerances a small amount of rotation between the anti-siphon device 300 and the fuel tank inlet 200 may be permitted. It will be understood that although a small amount of rotation may be permitted, relative rotation between the anti-siphon device 300 and the fuel tank inlet 200 is substantially prevented.

Although within the present embodiment, relative rotation between the anti-siphon device (and hence closure flap) and fuel tank inlet is substantially prevented by a location feature which includes corresponding protrusion 309 and recess 209 in the groove 206 of the fuel tank inlet, and corresponding flanges 310 and recess 311 in the groove 308 of the anti-siphon device, in other embodiments relative rotation between the anti-siphon device and fuel tank inlet may be substantially prevented by any appropriate location feature. For example, the location feature may include a projection within the groove of the anti-siphon device (which extends radially outwards such that the radius of the projection is greater than the radius of the groove) and a corresponding recess in the retaining ring. The location feature may include a projection within the groove of the fuel tank inlet (which extends radially inwards such that the radius of the projection is less than the radius of the groove) and a corresponding recess in the retaining ring. Alternatively or in addition, the location feature may not include a portion of the retaining ring. For example, the fuel tank inlet may include a first location feature portion (e.g. a generally longitudinal recess) and the anti-siphon device may include a second location feature portion (e.g. a generally longitudinal flange) which co-operates with (e.g. is received by) the first location feature portion so as to substantially prevent relative rotation between the fuel tank inlet and anti-siphon device. This is similar to the protrusion 318 of the anti-siphon device and corresponding recess 209 of the fuel tank inlet discussed in more detail below. Some of these possibilities are discussed in more detail in relation to the embodiments discussed below.

The retaining ring 307 is formed of a resiliently deformable material such as, for example a metal such as spring steel or stainless spring steel. Referring to FIGS. 1 and 2, the anti-siphon device 300 defines a circumferentially tapered portion 317 that extends between the outer surface 306 and the anti-siphon portion 302. During assembly of the anti-siphon device 300, the anti-siphon portion 302 is passed through the centre of the retaining ring 307. The retaining ring 307 is then guided along the tapered portion 317 and is gradually widened. Once the retaining ring reaches the second groove 308 of the anti-siphon device 300, the resilient nature of the retaining ring 307 causes the retaining ring to return to an undeformed (or relatively less deformed) shape, in which the retaining ring is at least partially received by the second groove 308.

During installation of the anti-siphon device 300 within the fuel tank inlet 200, the body 301 of the anti-siphon device 300 is inserted into the fuel tank inlet 200 from an exterior of the fuel tank 400 (i.e. a position vertically above the fuel tank inlet 200 in the Figures) in a direction parallel to the longitudinal axis X. The tapered portion 317 of the anti-siphon device 300 may contact the annular portion 202 so as to guide the anti-siphon device into the correct position. As can be seen in FIG. 3, the ends 310 of the retaining ring 307 define a small gap between them. As the anti-siphon device 300 is inserted into the fuel tank inlet 200, the retaining ring 307 is circumferentially compressed by the user to move the ends 310 of the retaining ring 307 closer together.

In doing so, the diameter of the retaining ring becomes smaller than the diameter of the inner surface 204 of the annular portion.

As can be seen in FIG. 2, the recess 209 of the annular portion 202 extends longitudinally such that the recess 209 is open in a direction towards the opening 206 of the fuel tank inlet 200. That is to say, the recess 209 also forms a longitudinally extending recess of the ledge 205 of the annular portion 202 such that the recess 209 may be accessed in a longitudinal direction. As such, once the retaining ring 307 has been compressed by the user, the protrusion 309 of the retaining ring may pass into the recess 209 via the longitudinally open part of the recess 209. The anti-siphon device 300 is then moved in a longitudinal direction until the retaining ring 307 is aligned with the first groove 206 of the annular ring 202. Once the retaining ring 307 and the first groove 206 of the annular ring 202 are aligned, due to the resilience of the retaining ring 307, the retaining ring 307 returns to an undeformed (or relatively less deformed) position in which the retaining ring 307 is partially received by both the first and second grooves 206, 308. As such, receipt of the retaining ring 307 within the first groove 206 occurs automatically (i.e. it occurs due to the resilience of the retaining ring 307 and without input from the user). It follows that it can be said that the first locking portion of the fuel tank inlet and the second locking portion of the anti-siphon device engage automatically so as to secure the anti-siphon device to the fuel tank inlet.

Figure 4:
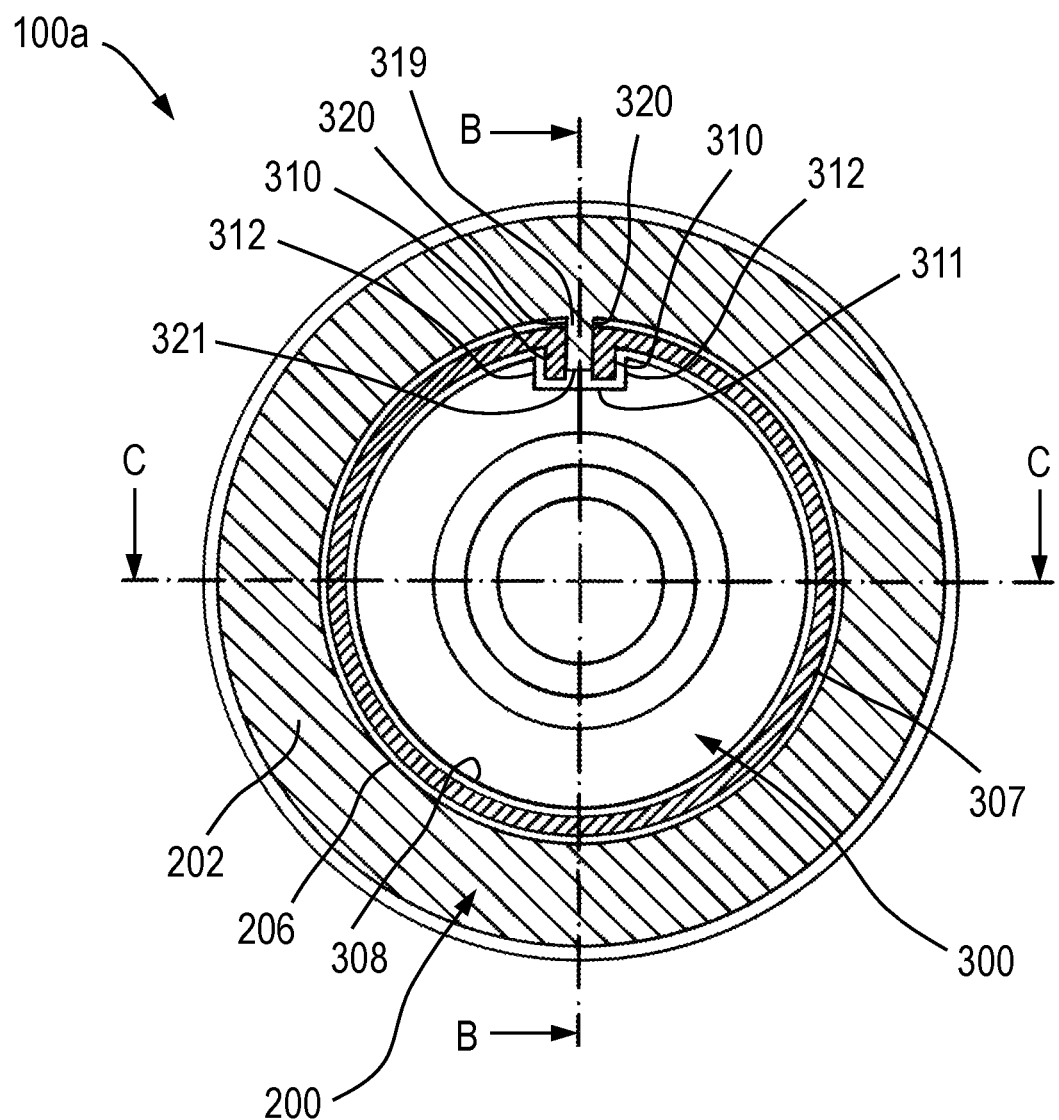
FIG. 4 is a top-down cross-sectional view of a second embodiment of a fuel tank inlet assembly.

FIG. 4 shows a cross-sectional view of a second embodiment of a fuel tank inlet assembly 100a taken along the plane A-A. The fuel tank inlet assembly 100a differs from the fuel tank inlet assembly 100 of the first embodiment of the invention in that the first location feature comprises an inwardly extending protrusion 319, and in that the second location feature comprises the ends 310 of the retaining ring 307 and the walls 312 of the inwardly recessed portion 311 of the anti-siphon device 300. It should be noted that the second embodiment of the invention further differs from the first embodiment of the invention in that the fuel tank inlet 200 does not comprise the recess 209 formed in the first groove 206 of the annular ring 202, nor the corresponding protrusion 309 of the retaining ring.

The protrusion 319 is at least partially defined by the first groove 206 of the annular ring 202 and extends from the first groove 206 radially inwardly towards the anti-siphon device 300. The inwardly extending protrusion 319 defines sides 320 which are configured to engage the inwardly extending flanges of the ends 310 of the retaining ring 307 so as to prevent relative rotation between the retaining ring 307 and the fuel tank inlet 200. The inwardly extending flanges of the ends 310 of the retaining ring 307 are further configured to engage the walls 312 of the recessed portion 311 of the first groove 206 so as to prevent relative rotation between the retaining ring 307 and the anti-siphon device 300. Although the ends 310 of the retaining ring 307 are shown as being permanently in contact with both sides the sides 320 of the inwardly extending portion 319, it will be appreciated that in some embodiments of the invention the ends 310 of the retaining ring 307 need not permanently contact both sides 320 of the inwardly extending portion 319—that is to say, the ends of the retaining ring may be spaced from one or both of the sides of the inwardly extending protrusion.

The inwardly extending protrusion 319 defines a distal end 321 disposed opposite the first groove 206 which extends into the recessed portion 311 of the second groove 308. That is to say, the end 321 of the inwardly extending protrusion extends away from the inner surface 204 of the fuel tank inlet 200 towards the longitudinal axis of the fuel tank inlet assembly 100 (i.e. the end 321 of the inwardly protruding portion 319 stands proud of the inner surface 204 of the fuel tank inlet 200). As such, the end 321 of the inwardly recessed portion 311 extends longitudinally downwards through the anti-siphon device 300 to the tapered portion 317 so as to permit the inwardly extending protrusion 319 and the ends 310 of the retaining ring 307 to enter the recessed portion 311 when the anti-siphon device 300 is inserted into the fuel tank inlet 200. That is to say, the recessed portion 311 is open in the longitudinal direction, for example in a direction normal to the plane of the cross-section shown in FIG. 4. In some embodiments the recessed portion 311 may be closed at one end. For example, the end of the recessed portion which is longitudinally closest to the opening of the fuel tank inlet. In some embodiments of the present invention, the end 321 of the inwardly extending protrusion 319 may be integral with the inner surface 204 of the fuel tank inlet 200 (i.e. such that the end 321 and the inner surface 204 are the same surface—the end not extending radially inwards beyond the inner surface 204), and as such there is no need for the recessed portion to extend longitudinally downwards through the anti-siphon device 300 to the tapered portion 317.

Figure 5:
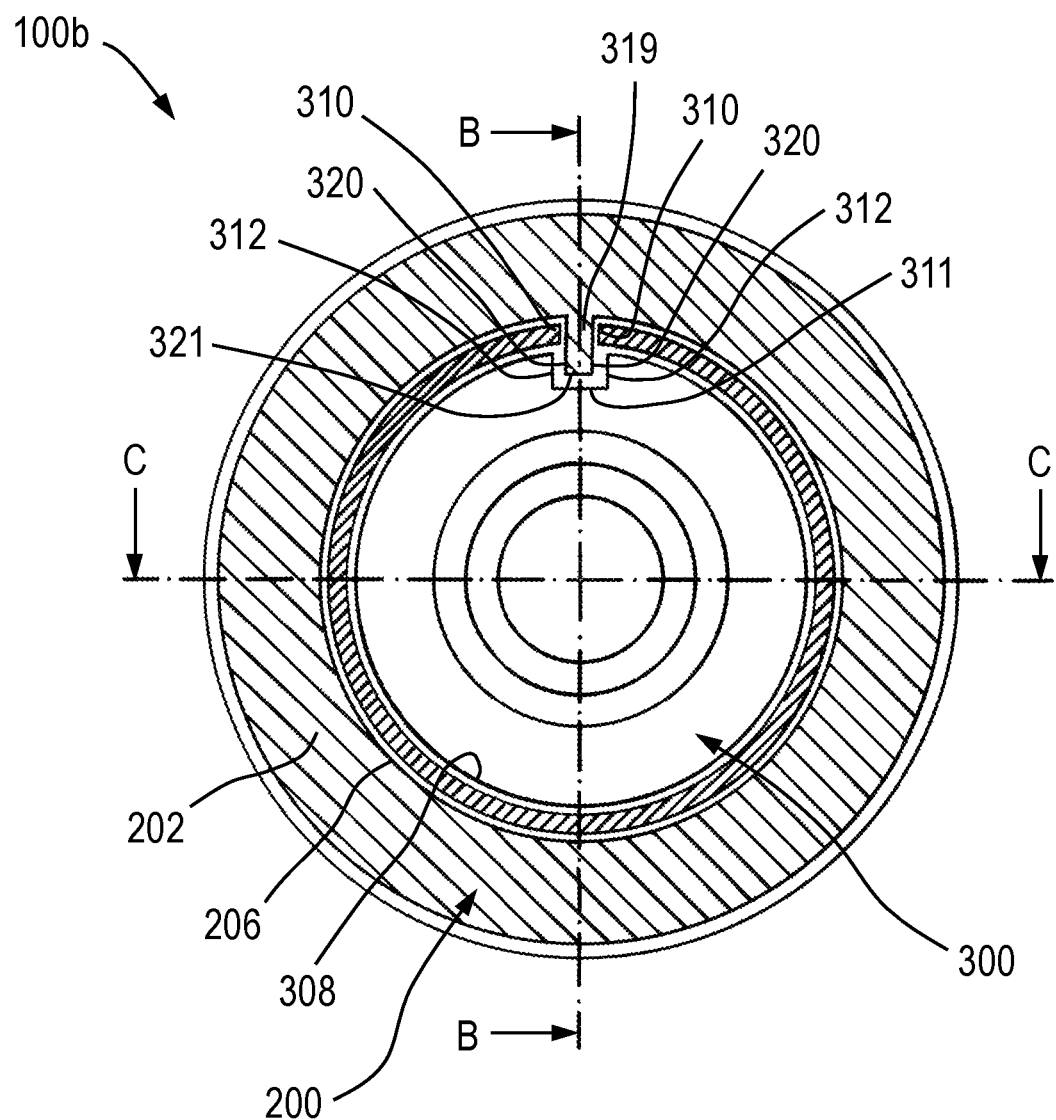
FIG. 5 is a top-down cross-sectional view of a third embodiment of a fuel tank inlet assembly.

FIG. 5 shows a cross-sectional view of a third embodiment of a fuel tank inlet assembly 100b taken along the plane A-A. The fuel tank inlet assembly 100b differs from the fuel tank inlet assembly 100a of the second embodiment of the invention in that the second location feature is defined only by the walls 312 of the inwardly recessed portion 311 of the anti-siphon device 300. The ends 310 of the retaining ring 307 do not comprise inwardly extending flanges and therefore the walls 312 of the inwardly recessed portion 311 of the anti-siphon device 300 are configured to directly engage the sides 320 of the inwardly extending protrusion 319 so as to prevent relative rotation between the anti-siphon device 300 and the fuel tank inlet 200. It will be appreciated that because the ends 310 of the retaining ring 307 do not comprise inwardly extending flanges, substantially no part of the retaining ring 307 interposes the sides 320 of the inwardly extending protrusion 319 and the walls 312 of the inwardly recessed portion 311 when the inwardly extending protrusion 319 and the inwardly recessed portion 311 are engaged.

It will be appreciated that in order to ensure that the inwardly extending protrusion 319 is engageable with the inwardly recessed portion 311, the end 321 of the inwardly extending protrusion 319 must extend inwardly by a distance sufficient such that at least a portion of the protrusion 319 is located in the inwardly recessed portion 311. That is to say, the end 321 of the inwardly extending protrusion extends away from the inner surface 204 of the fuel tank inlet 200 towards the longitudinal axis of the fuel tank inlet assembly 100b (i.e. the end 321 of the inwardly protruding portion 319 stands proud of the inner surface 204 of the fuel tank inlet 200). It will therefore be appreciated that the inwardly recessed portion 311 extends in a longitudinal direction to the tapered portion 317 so as to permit the inwardly extending protrusion 319 to enter the recessed portion 311 when the anti-siphon device 300 is inserted into the fuel tank inlet 200. As discussed in relation to the second embodiment, the recessed portion 311 may be open in the longitudinal direction or may be closed at one end. For example, the end of the recessed portion which is longitudinally closest to the opening of the fuel tank inlet.

With reference to FIG. 2, in some embodiments of the invention the anti-siphon portion 300 further comprises a longitudinally extending protrusion 318 of the circumferential flange 305. The longitudinal protrusion 318 is configured to be received within an upper portion 209a of the recess 209 circumferentially proximate the ledge 205 of the annular portion 202. Rotational movement of the anti-siphon device 300 relative to the fuel tank inlet 200 will cause the longitudinal protrusion 318 to engage one of the sides 210 of the recess 209 of the annular portion 202. It will be appreciated that this engagement between the anti-siphon device 300 and fuel tank inlet 200 acts in addition to the retaining ring 307 to substantially prevent relative rotation between the anti-siphon device 300 and the fuel tank inlet 200.

In the method of installing the anti-siphon device into the fuel inlet discussed above the retaining ring is first located in the groove of the anti-siphon device and then the retaining ring and anti-siphon device are inserted into the fuel inlet such that the retaining ring is also located in the groove of the fuel tank inlet. In other embodiments the installation procedure may be the other way round—that is to say, the retaining ring may first be located in the groove of the fuel inlet and then the anti-siphon device may be inserted into the fuel inlet such that the retaining ring is also located in the groove of the anti-siphon device.

In the above described embodiment the anti-siphon device includes a tapered portion adjacent the locking portion (e.g. groove) of the anti-siphon device in order to help guide another locking portion (e.g. retaining ring) into the locking portion (e.g. groove) of the anti-siphon device. In addition, or alternatively, in other embodiments the fuel tank inlet (e.g. the annular portion of the fuel tank inlet) may include a tapered portion adjacent the locking portion (e.g. groove) of the fuel tank inlet in order to help guide another locking portion (e.g. retaining ring) into the locking portion (e.g. groove) of the fuel tank inlet.

Within the above described embodiment the fuel tank inlet assembly includes a first locking portion in the form of a groove in the fuel tank inlet, and a second locking portion in the form of a retaining ring and a groove in the anti-siphon device. It may equally be said that the fuel tank inlet assembly includes a first locking portion in the form of a groove in the fuel tank inlet and the retaining ring, and a second locking portion in the form of the groove in the anti-siphon device. As already discussed, in other embodiments any appropriate locking portions may be used provided that they co-operate to non-releasably attach the anti-siphon device to the fuel tank inlet.

Figure 6:
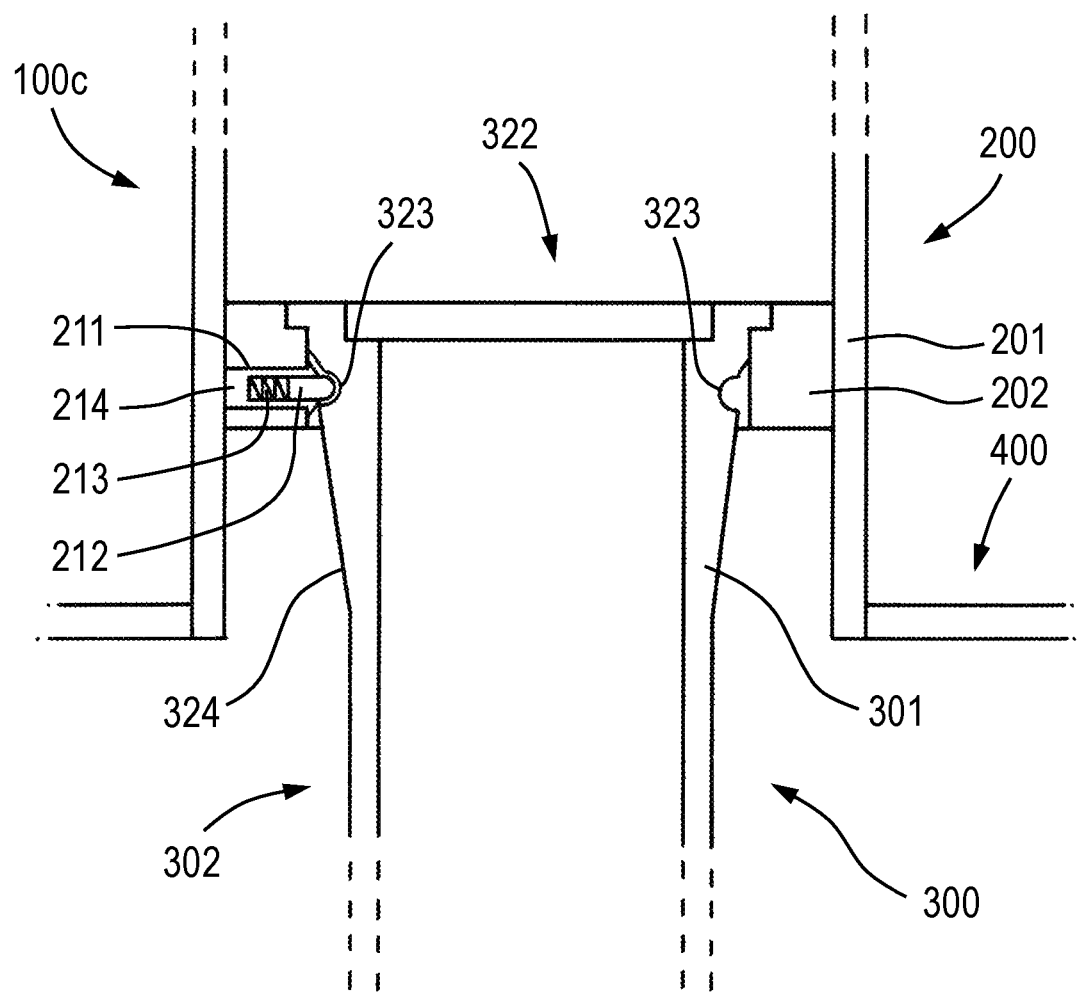
FIG. 6 is a side-on cross-sectional view of a fourth embodiment of a fuel tank inlet.

FIG. 6 shows a fourth embodiment of a fuel tank inlet assembly 100c. For consistency with FIGS. 1 to 5, the same reference numerals are used to refer to features of the fourth embodiment which are equivalent to those of the other embodiments. The upper part of the fuel tank inlet 200 and the lower part of the anti-siphon device 300 have been omitted from FIG. 6 for clarity, as indicated by dashed lines.

In the fourth embodiment, fuel tank inlet 200 comprises a first locking portion in the form of one or more nose plungers 211 configured to engage a second locking portion in the form of a corresponding recess 323 of the anti-siphon device 300. This embodiment is equivalent to the previously described embodiments in that the one or more nose plungers 211 may be considered to define an inner surface defining the first locking portion; and the recess 323 defines the second locking portion. Each nose plunger 211 comprises a retractable nose element 212 which is outwardly biased by a spring 213 contained within a nose plunger body 214. The nose plunger 211 comprises a stop mechanism which restricts the maximum extension of the nose element from the body 214 so as to prevent the nose element 212 from falling out of the nose plunger 211. The annular ring 202 comprises a radially extending through-hole for the receipt of each nose plunger 211. The body 214 may be held within the hole of the annular ring 202 in any suitable manner, such as for example via: an interference fit, adhesive, or corresponding screw threads formed on the outside of the body 214 and the inside of the hole.

During use, the anti-siphon device 300 is inserted into the fuel tank inlet 200 as per the previous embodiments, such that during insertion a tapered portion 324 of the anti-siphon device body 301 causes the nose element 212 to retract against the action of the spring 213. The tapered portion 324 may further act as a guide for positioning the anti-siphon device 300 within the annular ring 202. Once the anti-siphon device 300 has been inserted into the fuel tank inlet 200 sufficiently far that the recess 323 is aligned with the nose plunger 211, the nose element 212 extends into the recess 323 so as to lock the anti-siphon device 300 to the fuel tank inlet 200. The recess 323 of the anti-siphon device may be any suitable shape so as to receive the nose element 212 in a locking manner. In particular, the recess 323 extends radially inwards by a distance large enough to permit a radial overlap between the nose element 212 and the recess 323, thereby preventing movement of the anti-siphon device 300 out of the fuel tank inlet 200.

The recess 323 may be a groove which extends around the circumference of the body portion 301 so as to be able to engage multiple nose plungers 211 distributed around the annular ring 202. Alternatively, the recess 323 may be a blind hole configured to align with and receive a single nose plunger 211. In such an embodiment, the anti-siphon device 300 may comprise multiple recesses 323 which are configured to align with and receive a single nose plunger 211. It will be appreciated that in such embodiments, the alignment between the nose plunger(s) 211 and the recess(s) 323 has the effect that rotation of the fuel tank inlet relative to the anti-siphon device 300 is prevented. As such, the nose plunger 211 and recess 323 may be said to provide location features for preventing relative rotation between the fuel tank inlet 200 and the anti-siphon device 300. Additionally or alternatively, the fuel tank inlet 200 and the anti-siphon device 300 may comprise other location features so as to prevent rotational movement therebetween, such as for example the protrusion 318 and recess 209 of the first embodiment, shown in FIG. 2.

It will be appreciated that in alternative embodiments of the invention the anti-siphon device 300 may comprise a nose plunger and the fuel tank inlet 200 may comprise a recess or groove configured to engage the nose plunger in the same manner as described above. It will be appreciated that the anti-siphon device 300 of the fourth embodiment is in all other respects substantially the same as the anti-siphon device of the previous embodiments. In particular, the anti-siphon device 300 includes an anti-siphon portion 302 configured to prevent access to an interior of the fuel tank 400 by a siphon tube.

It will be appreciated that alternative embodiments the fuel tank inlet assembly 100-100c may comprise substantially any suitable pair of locking portions which are able to secure the anti-siphon device 300 to the fuel tank inlet 200 in a locking manner. For example, one of the locking portions may be a resiliently deformable arm, and the other of the locking portions may be a recess configured to receive the arm such that the arm and the recess form a snap fit engagement.

Although the fuel tank inlet 200 and anti-siphon device 300 described above comprise a generally tubular body portions 201, 301 which are described as generally cylindrical, it will be appreciated that in alternative embodiments of the invention, the fuel tank inlet 100 and anti-siphon device 300 may comprise tubular body portions which are non-cylindrical. For example, the body portions 201, 301 may comprise a hexagonal, pentagonal or rectangular cross-section.

It will be appreciated that in some embodiments the body portion 201 of the fuel tank inlet 200 may extend into the interior 402 of the fuel tank 400. That is to say, the body portion 201 may extend below the wall 401 of the fuel tank 400. For example, the body portion 201 may extend into the interior 402 of the fuel tank 400 such that the body portion 201 entirely encompasses the anti-siphon device 300.

Although the fuel tank inlet 200 and anti-siphon device 300 are described above as being formed of metal, it will be appreciated that the fuel tank inlet 200 and anti-siphon device 300 may be formed of any other suitable material, such as, for example plastic.

In some instances the inwardly extending annular portion (or ring) may be supplied as a separate piece together with the anti-siphon device such that the annular portion can be retrofitted to a fuel tank inlet such that the anti-siphon device can be inserted into the retrofitted annular portion to form a fuel tank inlet assembly according to the present invention.

The invention claimed is:

1. A fuel tank inlet assembly comprising:
a fuel tank inlet defining an opening, the fuel tank inlet configured to form part of a fuel tank; and
an anti-siphon device which extends along a longitudinal axis and which is configured for receipt by the fuel tank inlet; the anti-siphon device defining an inlet aperture and comprising an anti-siphon portion configured to inhibit the passage of a siphon tube through the anti-siphon device;
wherein the fuel tank inlet comprises a first locking portion and the anti-siphon device comprises a second locking portion configured to engage the first locking portion so as to secure the anti-siphon device to the fuel tank inlet such that the anti-siphon device is positioned within the fuel tank inlet entirely beyond the opening;
wherein the first locking portion comprises a first circumferentially extending groove defined by an inner surface of the fuel tank inlet; and the second locking portion comprises a retaining ring configured to be at least partially received by the first groove; and
wherein the anti-siphon device comprises a second circumferentially extending groove defined by an outer surface of the anti-siphon device; and the second groove is configured to at least partially receive the retaining ring.

2. A fuel tank inlet assembly according to claim 1, wherein:
the first locking portion defines a first location feature; and
the second locking portion defines a second location feature configured to co-operate with the first location feature so as to prevent relative rotation between the fuel tank inlet and the anti-siphon device.

3. A fuel tank inlet assembly according to claim 2, wherein the anti-siphon device includes an inwardly recessed portion.

4. A fuel tank inlet assembly according to claim 3, wherein the retaining ring defines an end, and wherein the end is configured to engage the inwardly recessed portion so as to prevent relative rotation between the retaining ring and the anti-siphon device.

5. A fuel tank inlet assembly according to claim 4, wherein the end of the retaining ring comprises an inwardly extending protrusion configured for receipt by the inwardly recessed portion of the second groove, and wherein in use engagement of the inwardly extending protrusion and a wall of the inwardly recessed portion prevents relative rotation between the retaining ring and the anti-siphon device.

6. A fuel tank inlet assembly according to claim 1, wherein:
the first locking portion defines a first location feature;
the second locking portion defines a second location feature configured to co-operate with the first location feature so as to prevent relative rotation between the fuel tank inlet and the anti-siphon device;
the first location feature comprises a radially outwardly extending recess formed within the first circumferentially extending groove; and
the second location feature comprises a protrusion of the retaining ring;
wherein during normal use the protrusion of the retaining ring engages with a wall of the recess so as to substantially prevent relative rotation between the fuel tank inlet and the anti-siphon device.

7. A fuel tank inlet assembly according to claim 3, wherein the first location feature comprises a radially inwardly extending protrusion.

8. A fuel tank inlet assembly according to claim 7, wherein the retaining ring defines an end configured to engage the radially inwardly extending protrusion of the fuel tank inlet and the inwardly recessed portion of the anti-siphon device so as to prevent relative rotation between the fuel tank inlet and the anti-siphon device.

9. A fuel tank inlet assembly according to claim 7, wherein the inwardly extending protrusion of the fuel tank inlet is configured to directly engage the inwardly recessed portion of the anti-siphon device so as to prevent relative rotation between the fuel tank inlet and the anti-siphon device.

10. A fuel tank inlet assembly according to claim 1, wherein the fuel tank inlet assembly further comprises a closure portion.

11. A fuel tank inlet assembly according to claim 10, wherein the closure portion defines an aperture configured to receive a fuel dispenser, and wherein the closure portion further comprises a closure flap configured to selectively open and close the aperture.

12. A fuel tank inlet assembly according to claim 11, wherein the aperture is defined by an inwardly extending annular flange, and wherein the closure portion further comprises a biasing member configured to urge the closure flap into a closed position in which the closure flap bears against the annular flange.

13. A fuel tank inlet assembly according to claim 11, wherein the closure flap is configured such that during use when a nozzle of the fuel dispenser is inserted into the aperture to contact the closure flap the closure flap is urged towards an open position in which the nozzle passes through the aperture to permit fuel to be dispensed into the fuel tank.

14. A fuel tank inlet assembly according to claim 10, wherein the closure portion is positioned between the opening of the fuel tank inlet and the first locking portion.

15. A fuel tank inlet assembly according to claim 1, wherein one of the first and second locking portions comprises a resiliently deformable member.

16. An anti-siphon device comprising:
a generally tubular body configured for receipt by a fuel tank inlet; the body defining an inlet aperture;
an anti-siphon portion supported by the body and configured to inhibit the passage of a siphon tube through the body; and
a locking portion configured to engage a corresponding locking portion of the fuel tank inlet to thereby secure the anti-siphon device to the fuel tank inlet such that the anti-siphon device is positioned within the fuel tank inlet entirely beyond an opening of the fuel tank inlet;
wherein the locking portion comprises a retaining ring configured to be at least partially received by the corresponding locking portion of the fuel tank inlet; and
wherein the anti-siphon device comprises a circumferentially extending groove defined by an outer surface of the anti-siphon device; and the circumferentially extending groove is configured to at least partially receive the retaining ring.

17. A fuel tank inlet assembly comprising:
a fuel tank inlet defining an opening, the fuel tank inlet configured to form part of a fuel tank; and
an anti-siphon device which extends along a longitudinal axis and which is configured for receipt by the fuel tank inlet; the anti-siphon device defining an inlet aperture and comprising an anti-siphon portion configured to inhibit the passage of a siphon tube through the anti-siphon device;
wherein the fuel tank inlet comprises a first locking portion and the anti-siphon device comprises a second locking portion configured to engage the first locking portion so as to secure the anti-siphon device to the fuel tank inlet such that the anti-siphon device is positioned within the fuel tank inlet entirely beyond the opening; and
wherein one of the first locking portion and the second locking portion is a nose plunger and the other of the first locking portion and the second locking portion is a recess configured to receive the nose plunger.

* * * * *